Patented Jan. 8, 1924.

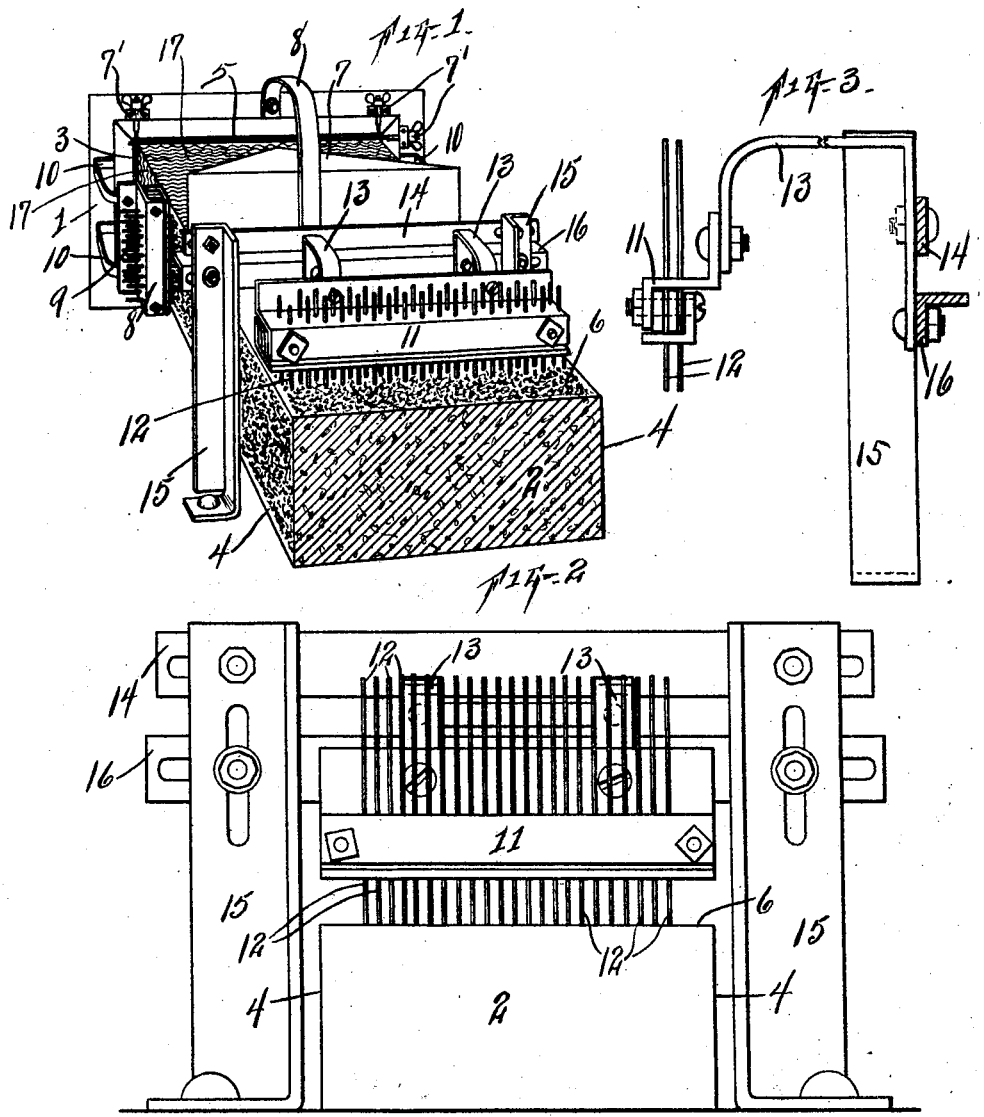

1,480,433

UNITED STATES PATENT OFFICE.

BOB GOEN, OF MILLSAP, TEXAS, ASSIGNOR TO ACME BRICK COMPANY, OF FORT WORTH, TEXAS, A CORPORATION OF TEXAS.

METHOD OF FORMING RUG TEXTURE SURFACES ON BRICK AND TILE AND THE LIKE.

Application filed June 14, 1923. Serial No. 645,453.

*To all whom it may concern:*

Be it known that I, BOB GOEN, a citizen of the United States, residing at Millsap, in the county of Parker and State of Texas, have invented certain new and useful Improvements in Methods of Forming Rug Texture Surfaces on Brick and Tile and the like, of which the following is a specification.

My invention relates to a method of ornamenting brick and tile and the like or making a rough texture for the purpose of ornamenting brick and tile and the like; and the object is to provide in the manufacture of brick and tile a method of making rough texture on the surfaces of brick and tile by giving a double treatment in a continuous operation and to effect such rough texture. The material is treated first to obtain a matte texture and then treated to secure a rug texture and this treatment follows immediately after the material emerges from the auger machine in a continuous stream or column or bar without stopping the moving column or stream of material, this column being of the required height and width to make the brick or tile.

Reference is had to the accompanying drawings which illustrate the method hereinafter set forth.

Fig. 1 is a perspective view of the apparatus for carrying out the method of preparing the surfaces of the brick and tile. Fig. 2 is a front elevation of the same. Fig. 3 is a detail view of the devices for treating the surfaces of the material.

Similar characters of reference are used to indicate the same parts throughout the several views.

The improved method of treatment commences as soon as the stream or column of green material leaves the auger machine. The auger machine or apparatus 1 is of ordinary type and permits a column of the required width and depth to emerge therefrom. This column moves on to the cutting machine (not shown). As the column 2 emerges from the auger or forming apparatus, one treatment is given by wires which impart a matte texture to the column. Wires 3 operate on the sides 4 and a wire 5 operates on the top 6 of the green column. These wires 3 and 5 are to be kept taut and this is done by thumb nut connections 7' or other means. The wires 3 and 5 are positioned slightly further inward than the walls of the auger apparatus in order to cut off the surfaces of the green column. Treatment by the wires 3 and 5 produces the matte surface.

The apparatus is provided with the usual plow or scraper 7 which is suspended by a hanger 8 for holding the scraper or plow 7 above and in close proximity to the surface 6 of the green column for removing the cuttings from the green or moving column 2. The scraper or plow 7 may or may not be used to remove the surplus or loose material left by the wire 5 before the second treatment of the top surface 6.

Immediately after the matte textures 4 and 6 have been formed and in the continuous movement of the column of green material, these surfaces are treated to form the rug textures on the surfaces 4 and 6 as follows: Means are provided for scoring or scratching the surfaces. For the lateral surfaces 4, brackets 8 are attached to the end of the augur apparatus 1 and small wires or nails 9 are projected through these brackets and clamped therein, as more clearly illustrated in Fig. 3. The brackets 8 are held in place by spring braces 10 which are attached to the brackets 8 and to the auger apparatus 1. By such mounting, there will be more or less yielding motion of the brackets 8 and such yielding motion permits the scoring or scratching devices to follow on the edge of the brick or tile. For making the rug surface on the top of the brick, a bracket 11 is provided with steel wires or nails 12. The bracket 11 is mounted on an upright frame by means of spring steel arms 13 which are attached to the bracket 11 and to the cross-frame piece 14. The upright frame consists of two upright angle iron members 15 which are attached to some part of the platform of the apparatus and two cross bars 14 and 16 are attached to the uprights 15 to make them rigid. Spring steel hangers 13 are attached to the cross-bar 16 and to the bracket 11. Such construction and arrangement of the hangers permit the scoring or scratching device to follow the column. In positioning the scratching wires 9 and 12, care must be exercised to place the wires so that they will not scratch the surface entirely to the borders or edges of the surfaces. The edges must be left straight and if the wires were placed so that they would extend to the edges of the surfaces, the edges would be broken, making irregular outlines.

The two operations above described thus consist of first treating the uncured material on three surfaces, making what is called in the art "matte" surfaces 17 and this is accomplished, as above described, by placing the wires in position to remove the surface of the material as it emerges from the auger apparatus.

Then, without checking or changing the speed of the moving column, the same surfaces are treated with the scratching or scoring wires to produce the rough surfaces, called "rug" surfaces. The object is to remove all smooth surfaces from the face and ends of the bricks.

Actual use of these treatments under actual service conditions have demonstrated the utility of the treatment and the results are highly satisfactory.

The apparatus shown for carrying out the method illustrates one way of accomplishing the object sought. The apparatus may be varied without departing from my invention.

What I claim, is,—

1. A method of forming rug surfaces on the faces of brick and tile and the like which comprises treating the surfaces of green material while in motion to form matte surfaces and then scoring the matte surfaces while in motion to form the rug surfaces.

2. A method of forming rug surfaces on the faces of brick and tile and the like which comprises the forcing of a column of green material past trimming devices for forming first matte surfaces and then forcing the column of material past scoring devices for forming the rug surfaces.

3. A method of forming rug surfaces on the faces of brick and tile and the like which comprises moving a column of green material past trimming devices for forming matte surfaces and continuing the movement of the material without interruption and forcing the same surfaces past scoring devices for forming rug surfaces.

In testimony whereof, I set my hand, this 9th day of June, 1923.

BOB GOEN.